United States Patent
Kamen et al.

(10) Patent No.: US 6,357,544 B1
(45) Date of Patent: Mar. 19, 2002

(54) BALANCING VEHICLE WITH CAMBER AND TOE-IN

(75) Inventors: Dean L. Kamen; Douglas Field, both of Bedford, NH (US)

(73) Assignee: Deka Products Limited Partnership, Manchester, NH (US)

( * ) Notice: Subject to any disclaimer, the term of this patent is extended or adjusted under 35 U.S.C. 154(b) by 0 days.

(21) Appl. No.: 09/289,272

(22) Filed: Apr. 8, 1999

(51) Int. Cl.[7] ............................................... B62D 61/00
(52) U.S. Cl. .................. 180/218; 180/907; 280/86.753; 280/86.751
(58) Field of Search ........................ 180/218, 7.1, 907, 180/21; 280/250.1, 304.1, 86.753, 86.751; 701/124

(56) References Cited

U.S. PATENT DOCUMENTS

| | | | | |
|---|---|---|---|---|
| 584,127 A | * | 6/1897 | Draullette et al. | 180/218 |
| 726,897 A | * | 5/1903 | Freeman | 180/218 |
| 3,145,797 A | * | 8/1964 | Taylor | 180/21 |
| 3,399,742 A | * | 9/1968 | Malick | 180/21 |
| 5,294,142 A | * | 3/1994 | Weege | 280/250.1 X |
| 5,333,894 A | * | 8/1994 | Mayes | 280/250.1 X |
| 5,335,741 A | * | 8/1994 | Rabinovitz et al. | 180/907 |
| 5,480,172 A | | 1/1996 | James | 280/250.1 |
| 5,769,441 A | | 6/1998 | Namngani | 280/208 |
| 5,791,425 A | * | 8/1998 | Kamen et al. | 180/7.1 |
| 5,971,091 A | | 10/1999 | Kamen et al. | 180/218 |

FOREIGN PATENT DOCUMENTS

| | | |
|---|---|---|
| JP | 6-105415 | 12/1989 |
| JP | 404201793 A | * 7/1992 |
| WO | WO89/06117 | * 7/1989 |

* cited by examiner

*Primary Examiner*—J. J. Swann
*Assistant Examiner*—F. Zeender
(74) *Attorney, Agent, or Firm*—Bromberg & Sunstein LLP

(57) ABSTRACT

A balancing vehicle having enhanced stability for transporting a payload. The vehicle has two substantially coaxial wheels coupled to a platform. Each wheel rotates about an axis, with the axis of each wheel disposed at a non-zero angle with respect to an axis that is defined by the centers of the respective wheels and that is substantially perpendicular to the direction of forward motion of the vehicle. The vehicle has a motorized drive that provides locomotion of the vehicle in an operating position that is unstable with respect to tipping if the motorized drive is not powered.

1 Claim, 5 Drawing Sheets

BALANCING VEHICLE WITH CAMBER AND TOE-IN

TECHNICAL FIELD

The present invention pertains to a balancing personal vehicle having a plurality of laterally disposed wheels, wherein improved stability is achieved by non-coaxiality of the wheels.

BACKGROUND OF THE INVENTION

Personal vehicles may be self-propelled and user-guidable, and, further, may entail stabilization in one or both of the fore-aft or left-right planes, such as when no more than two wheels are in ground contact at a time. Vehicles of this sort may be operated in a mode in which motion of the vehicle, including acceleration (both linear and turning), is controlled partially or entirely by leaning of the vehicle as caused by a subject riding the vehicle. Several such vehicles are described in U.S. Pat. No. 5,971,091, issued Oct. 26, 1999 which is incorporated herein by reference.

Such balancing vehicles may lack static stability. Referring, for example, to FIG. 1a, wherein a prior art personal transporter is shown and designated generally by numeral 18, a subject 10 stands on a support platform 12 and holds a grip 14 on a handle 16 attached to the platform 12, so that the vehicle 18 of this embodiment may be operated in a manner analogous to a scooter. A control loop may be provided so that leaning of the subject results in the application of torque to wheel 20 about axle 22 thereby causing an acceleration of the vehicle. Vehicle 18, however, is statically unstable, and, absent operation of the control loop to maintain dynamic stability, subject 10 will no longer be supported in a standing position and may fall from the platform. Another prior art balancing vehicle is shown in FIG. 1b and designated generally by numeral 24. Personal vehicle 24 shares the characteristics of vehicle 18 of FIG. 1a, namely a support platform 12 for supporting subject 10 and grip 14 on handle 16 attached to platform 12, so that the vehicle 18 of this embodiment may also be operated in a manner analogous to a scooter. Another prior art balancing vehicle is shown in FIG. 1c and designated generally by numeral 42. Personal vehicle 42 includes a seat 44 for the subject 46 on support platform 48. FIG. 2 shows that while vehicle 24 may have clusters 26 each having a plurality of wheels 28, vehicle 24 remains statically unstable and, absent operation of a control loop to maintain dynamic stability, subject 10 will no longer be supported in a standing position and may fall from platform 12. Balancing personal vehicles such as vehicle 18 of FIG. 1a and vehicle 24 of FIG. 1b may have pairs of wheels, such as wheels 30 and 32 shown in FIG. 1b, such that the wheels are substantially laterally disposed. Lateral disposition of wheels, as used in this description and in any appended claims, refers to the disposition of points of contact 34 and 36 of wheels 30 and 32 respectively, with the ground, on a line 38 that lies substantially transverse to the direction 40 of forward motion of the vehicle.

In cases where wheels are longitudinally displaced, such as on a bicycle or motorcycle, the vehicle is typically designed such that, in the absence of steering forces, a wheel will tend to return to the straight wheel travel condition. Such configurations may be said to be self-centering. A prior art vehicle having substantially laterally disposed wheels that are parallel lacks the inherent self-centering mechanism of a balancing vehicle with longitudinally disposed wheels. It is therefore desirable to provide such vehicles with inherent restoring mechanisms.

SUMMARY OF THE INVENTION

In accordance with a preferred embodiment of the invention, there is provided a device for transporting a payload over a surface. The direction of motion of the device defines a forward direction. The vehicle has a platform for supporting the payload and a first wheel having a center, with the first wheel coupled to the platform in such a manner as to rotate about a first axis. Additionally, the device has a second wheel having a center, where the second wheel is also coupled to the platform in such a manner as to rotate about a second axis. The platform with the payload and the two wheels constitute an assembly. The center of the second wheel and the center of the first wheel define a lateral axis which is substantially perpendicular to the forward direction, i.e., the wheels are substantially laterally disposed. In accordance with a preferred embodiment of the invention, an angle defined by the first axis with respect to the lateral axis and an angle defined by the second axis with respect to the lateral axis are each non-zero. The device also has a motorized drive arrangement coupled to the ground contacting module for causing locomotion of the assembly and the payload over the surface when the motorized drive is powered, in an operating position that is unstable with respect to tipping when the motorized drive is not powered. In accordance with an alternate embodiment of the invention, the vehicle may have a control loop in which the motorized drive is included for dynamically maintaining stability by operation of the motorized drive arrangement in such a manner that the net torque experienced by the assembly about the point of contact with the surface, taking into account torques caused by gravity and by all other external forces and by the motorized drive, causes a desired acceleration.

In accordance with an alternate embodiment of the present invention, the projections in a lateral plane of the angle defined by the first axis with respect to the lateral axis and the angle defined by the second axis with respect to the lateral axis are both non-zero. Alternately, the projections in a horizontal plane of the same angles may both be non-zero. The device may also have a handle, affixed to the platform, having a grip at approximately waist height of the subject, so that the device may be operated in a manner analogous to a scooter, and may further include a seat coupled to the platform for supporting a human subject.

BRIEF DESCRIPTION OF THE DRAWINGS

The invention will be more readily understood by reference to the following description, taken with the accompanying drawings, in which.

DETAILED DESCRIPTION OF PREFERRED EMBODIMENTS

Figure 2:
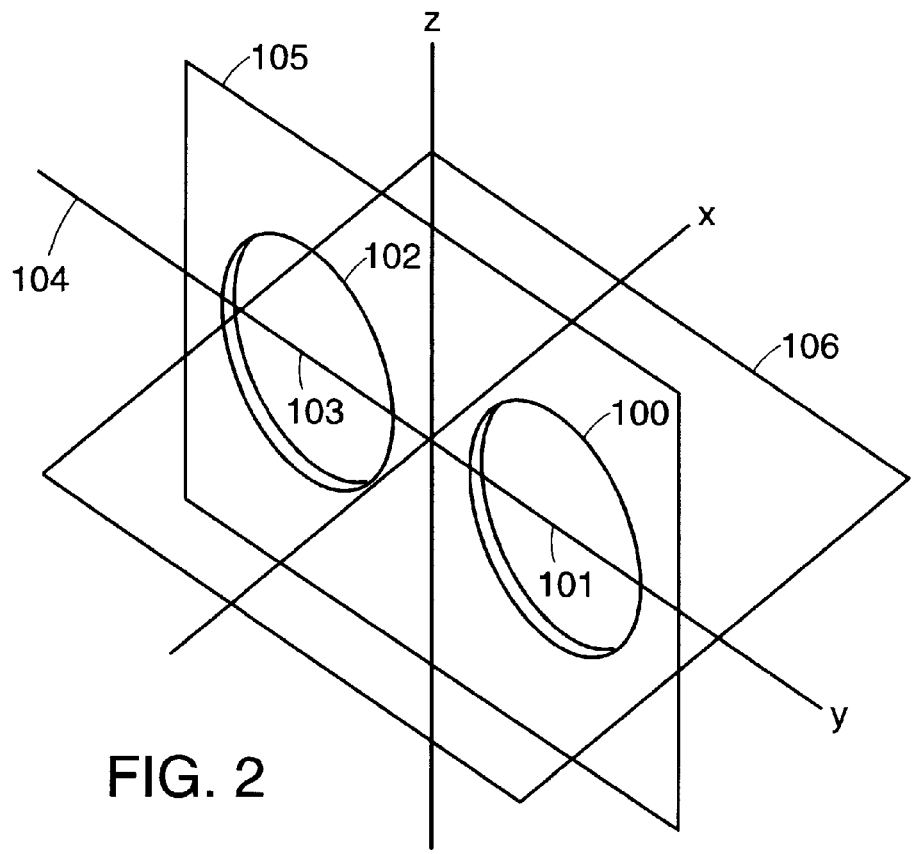
FIG. 2 is a perspective view of two laterally disposed wheels, defining the coordinate system in terms of which the following description is given.

The axles of substantially laterally disposed wheels of prior art balancing vehicle are parallel or collinear. In the following description and in any appended claims, rotation of a wheel of a vehicle will be referred to an axis about which the wheel rotation occurs. This axis may correspond to an axle of the wheel, although a corresponding axle need not be physically present, since the wheel may be mounted in any other manner known in the mechanical arts to provide for its rotation about an axis. Referring now to FIG. 2, wheels 100 and 102 of a personal vehicle are shown laterally disposed. Wheels 100 and 102 rotate, respectively, about centers 101 and 103 (defined in the planes of the inner surfaces of the respective wheels, or other convenient planes). The term "wheel," as used in this description and in any appended claims, is used inclusively and without limitation, and may refer to any manner of ground-contacting member having points of successive contact with the surface over which the vehicle travels, which points of successive contact are in rotation about an axis which may, or may not, correspond to a physical member, as has been discussed above. The axis 104 defined by centers 101 and 103 of wheels 100 and 102 is referred to herein as the y-axis, as shown. a vertical axis with respect to gravity defines the z-axis. The y-z plane is referred to as lateral plane 105. The x-axis is orthogonal to the y-z plane and corresponds, generally, to the direction of motion of the vehicle. Finally, the x-y plane is referred to as the horizontal plane and the x-z plane is referred to as the fore-aft plane.

Figure 1A:
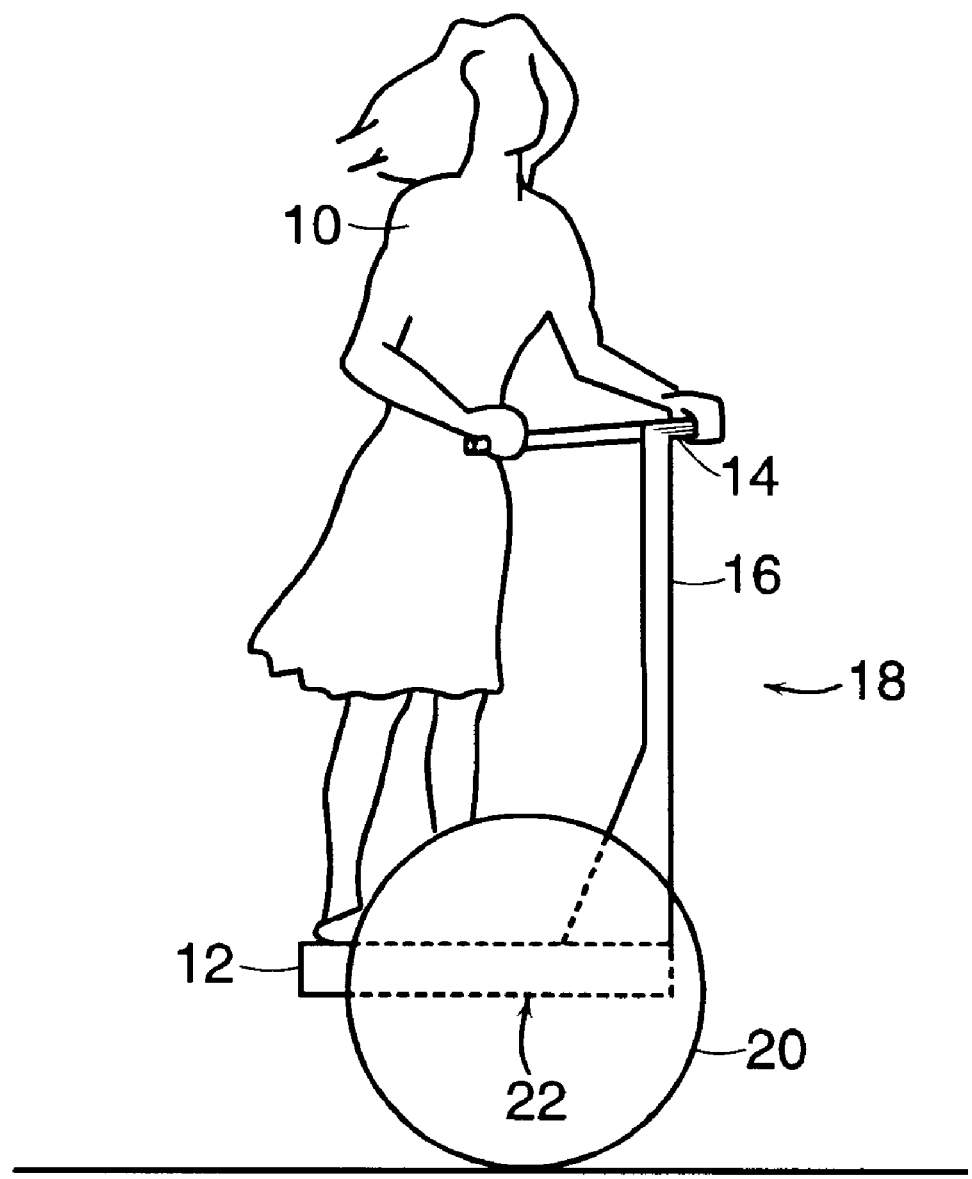
FIG. 1a is a side view of a prior art dynamically balancing vehicle of the type in which an embodiment of the invention may be advantageously employed.
Figure 1B:
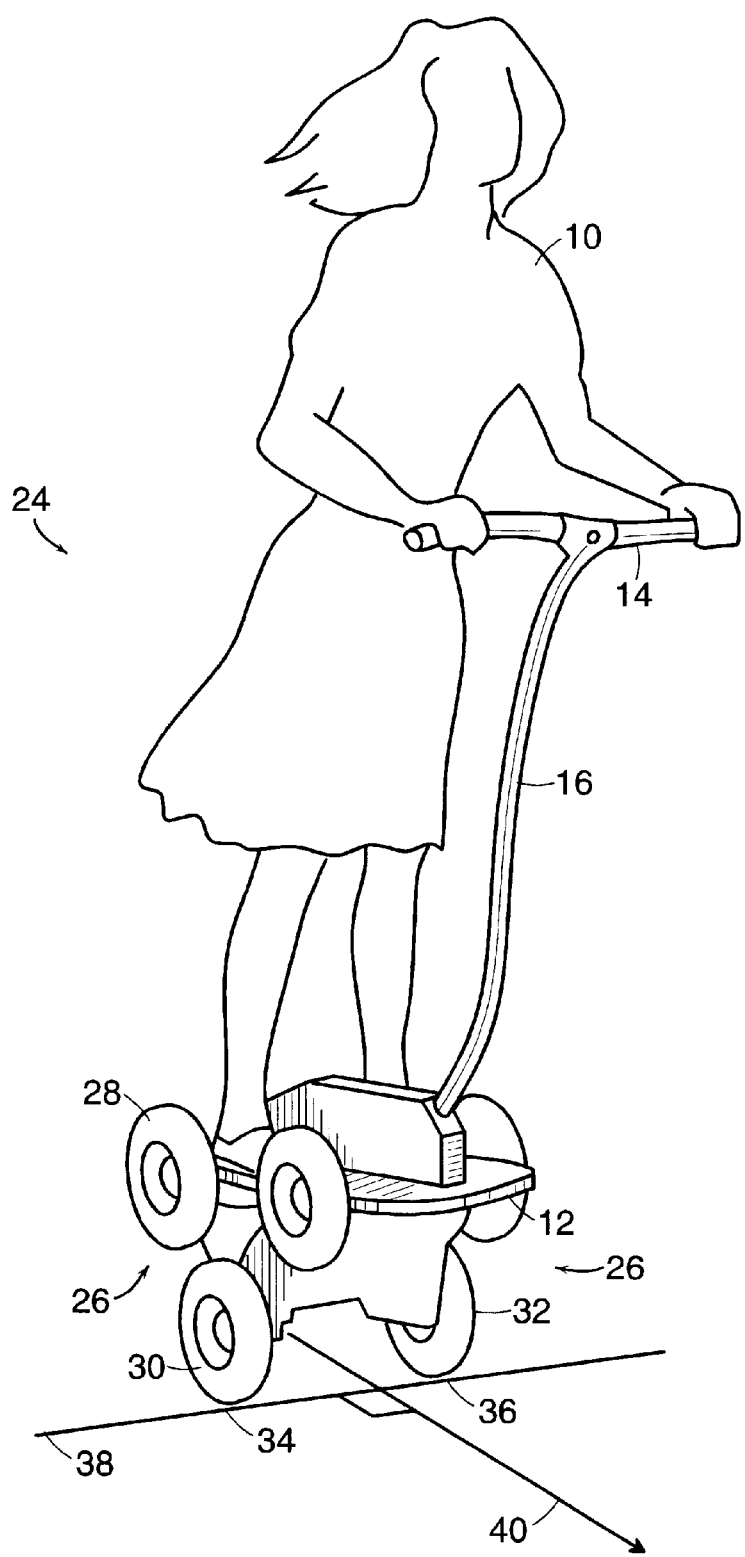
FIG. 1b is a side view of a further prior art dynamically balancing vehicle of the type in which an embodiment of the invention may be advantageously employed.
Figure 1C:
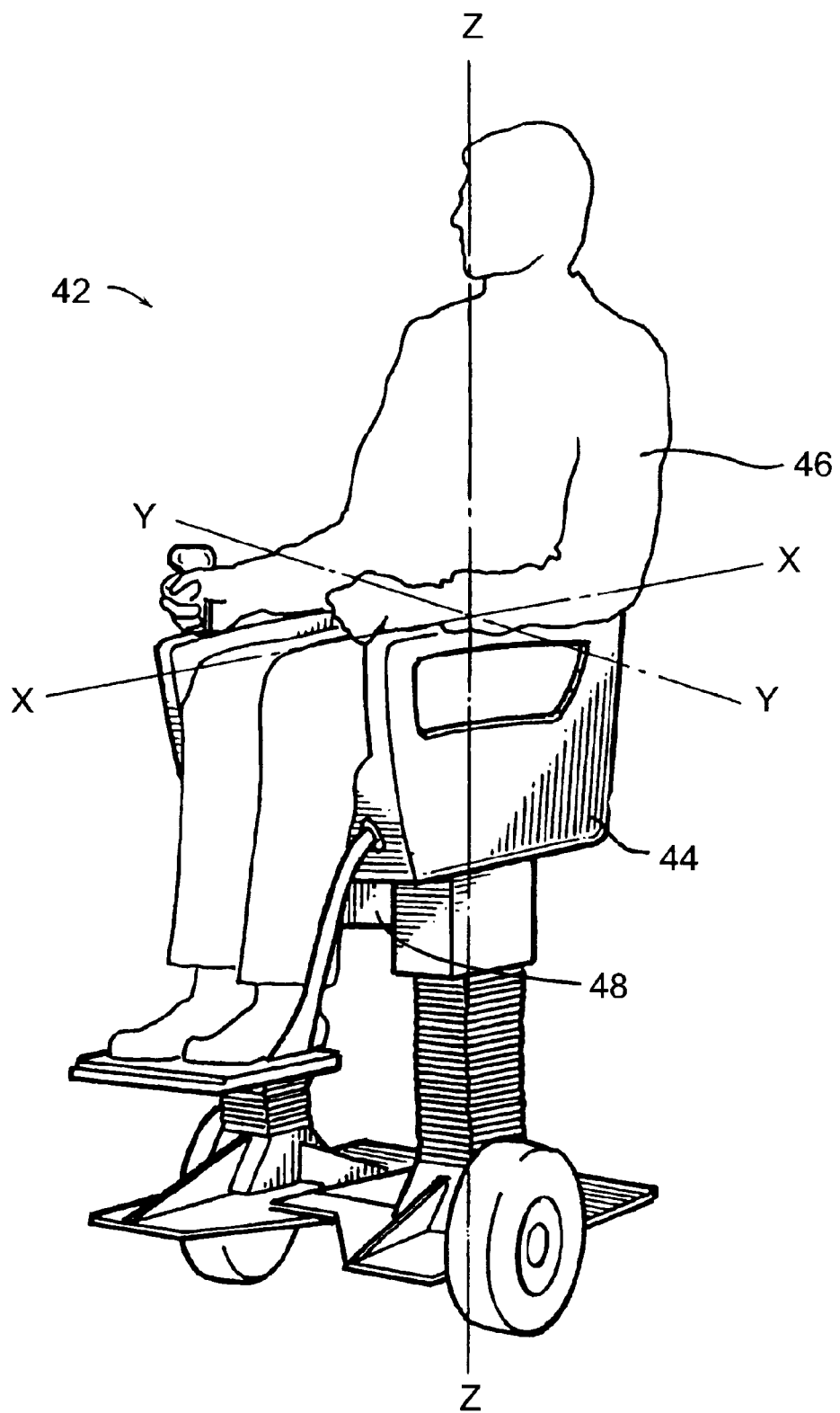
FIG. 1c is a side view of a further prior art dynamically balancing vehicle of the type in which an embodiment of the invention may be advantageously employed.
Figure 3:
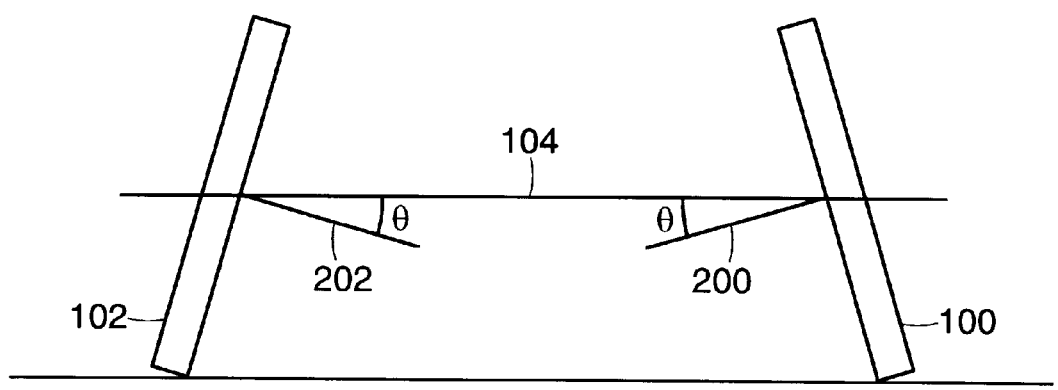
FIG. 3 is a cross-sectional view, in the lateral plane, of the laterally disposed wheels, showing a camber $\theta$ of the wheel axes in accordance with a preferred embodiment of the present invention.
Figure 4:
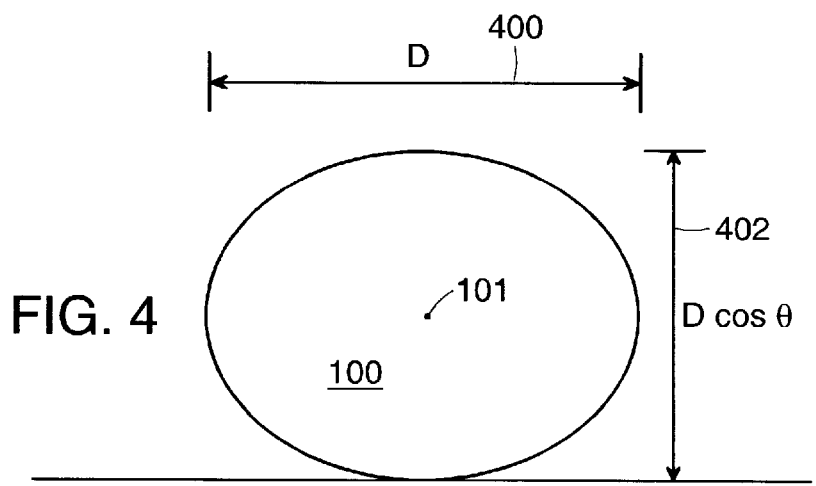
FIG. 4 shows a side view, showing the width and projected height of a wheel of FIG. 3 subject to camber.

Referring now to FIG. 3, a cross-section is shown of wheels 100 and 102 in the lateral plane (viewed from the front or rear of the vehicle). Wheel 100 rotates about a first axis 200, while wheel 102 rotates about a second axis 202. The camber $\theta$ of each wheel (which, in a general case, may be different for each wheel) is defined as the angle in the lateral plane between the axis 200, 202 of a wheel and the y-axis 104. Effects of introducing a camber are now discussed with reference to FIG. 4. FIG. 4 depicts a wheel 100 in side projection (on the x-z plane, i.e., as viewed from either side of the vehicle). Due to the camber of the wheel, its projection is an ellipse, as shown. The projected width 400 of the wheel is equal to the diameter D of the wheel, corresponding to the major axis of the projected ellipse. The projected height 402 of the wheel is reduced, due to the camber, and equals $D \cos \theta$. Were wheel 100 to be locked at its center 101 with respect to the vehicle 18 (shown in FIG. 1a), rotation of the vehicle would result in rotation of the projected ellipse of the wheel. Were the vehicle to be rotated 90° about the y axis, wheel center 101 would be lifted by $D(1-\cos \theta)/2$. Elevation of wheel center 101 corresponds to an increase in potential energy, the gradient of which is a restoring force that acts to keep the rotation of the vehicle zero, or, stated another way, to counteract rotation of the vehicle. Increasing camber $\theta$ increases the barrier of the potential well. Due to tire and vehicle design considerations, the camber is preferably in the range of 0°–10°.

Figure 5A:
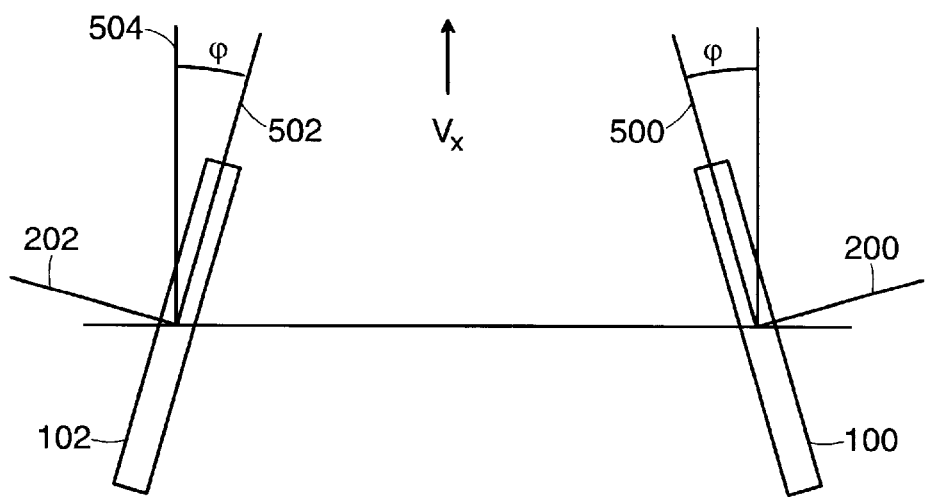
FIG. 5a is a cross-sectional view, in the horizontal plane, of the laterally disposed wheels, showing a toe-in of the wheel axes in accordance with a preferred embodiment of the present invention.
Figure 5B:
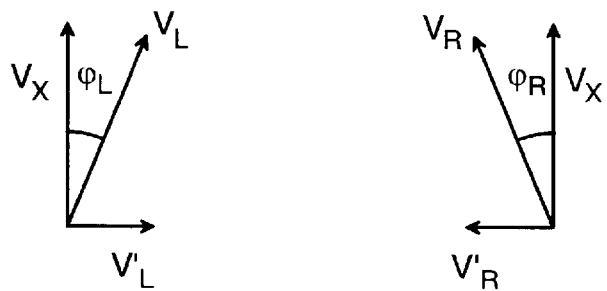
FIG. 5b is a schematic diagram of the velocity vectors of the respective laterally disposed wheels of FIG. 5a subject to toe-in in accordance with a preferred embodiment of the present invention.

Referring now to FIG. 5a, a cross-section is shown of wheels 100 and 102 in the horizontal plane (viewed from above or below the vehicle). Wheel 100 rotates about first axis 200, while wheel 102 rotates about second axis 202. The toe-in angle $\phi$ of each wheel (which, in a general case, may be different for each wheel) is defined as the angle between the normals 500 and 502 to respective axes 200, 202 of the wheels and the x-axis 504. Effects of introducing a camber are now discussed with reference to FIG. 5b. In order for the vehicle to travel in a straight line, the net lateral velocity must be zero, as a matter of definition. The net lateral velocity is given by: $\underline{v}_{net}=\underline{v}(\sin |\phi_{left}|-\sin |\phi_{right}|)$, where $\underline{v}_{net}$ is the net lateral velocity, $\underline{v}$ is the wheel velocity, and $\phi_i$ are the respect toe-in angles of the two wheels. Thus, if the toe-in angles are unequal, there will result a net lateral velocity, with the effect of equalizing the toe-in angles and restoring forward motion.

The described embodiments of the invention are intended to be merely exemplary and numerous variations and modifications will be apparent to those skilled in the art. All such variations and modifications are intended to be within the scope of the present invention as defined in the appended claims.

We claim:

1. A method for stabilizing a vehicle in a fore-aft plane with respect to tipping forward, the vehicle having a platform and a first and second wheel, each of the first and second wheels having a center, the center of the first wheel and the center of the second wheel defining a lateral axis, the first and second wheels being substantially coaxially disposed, the vehicle further having a motorized drive for causing locomotion of the vehicle in an operating position that is always unstable with respect to tipping in the fore-aft plane when the motorized drive is not powered, the method comprising:

a) coupling the first wheel to the platform in such a manner as to rotate about a first rotational axis such that a non-zero vertical angle is defined between the first rotational axis and the lateral axis;

b) coupling the second wheel to the platform in such a manner as to rotate about a second rotational axis, such that a non-zero vertical angle is defined between the second rotational axis and the lateral axis; and c) balancing the vehicle on the first and second wheels with respect to tipping in the fore-aft plane.

* * * * *